United States Patent [19]

Derryberry

[11] 4,224,754
[45] Sep. 30, 1980

[54] PORTABLE HUNTING BLIND

[76] Inventor: S. Wayne Derryberry, Box 54, Point Blank, Tex. 77364

[21] Appl. No.: 2,677

[22] Filed: Jan. 11, 1979

[51] Int. Cl.³ .......................................... A01M 31/02
[52] U.S. Cl. ........................................ 43/1; 135/1 R
[58] Field of Search ................ 43/1; 135/1 R, 5 B, 135/14 D; 297/DIG. 3

[56] References Cited

U.S. PATENT DOCUMENTS

| | | | |
|---|---|---|---|
| 1,581,180 | 4/1926 | Csajaghy | 135/1 R |
| 1,803,626 | 5/1931 | Lasley . | |
| 1,990,804 | 2/1935 | Watson | 135/5 B |
| 2,159,273 | 5/1939 | Killinger | 43/1 X |
| 2,594,410 | 4/1952 | Feldpausch . | |
| 2,661,010 | 12/1953 | Powers . | |
| 2,992,503 | 7/1961 | Webb . | |
| 3,039,478 | 6/1962 | Timmons . | |
| 3,112,956 | 12/1963 | Schick | 297/DIG. 3 X |
| 3,570,507 | 3/1971 | Kashuba . | |
| 3,572,836 | 3/1971 | Khanh | 297/DIG. 3 X |
| 3,690,334 | 9/1972 | Miller | 135/1 R |
| 3,746,386 | 7/1973 | Woodward | 135/1 R |
| 3,936,969 | 2/1976 | Richard | 43/1 |

*Primary Examiner*—Nicholas P. Godici
*Attorney, Agent, or Firm*—Gunn, Lee & Jackson

[57] ABSTRACT

A portable hunting blind is disclosed in the preferred embodiment. The illustrated form incorporates a coil spring which is coiled between two end rings and which elongates to deploy a hollow tube of cloth. The cloth is camouflaged on the exterior and is pattern marked with camouflage designs. The apparatus thus telescopes to a very small height and has the form of a stack of rings with attached camouflage material, a type of waterproof cloth. It has a flap covered door to be opened for a hunter to extend a rifle or shotgun through the opening. Additionally, it includes a sealed air-inflatable chair bottom and chair back for the comfort of the hunter.

1 Claim, 5 Drawing Figures

PORTABLE HUNTING BLIND

BACKGROUND OF THE DISCLOSURE

As shown in the references submitted simultaneously herewith, portable dressing rooms and various and sundry hunter blinds have been devised heretofore. Such structures find some interest, but it is submitted that the apparatus of this disclosure is superior in that it provides a lightweight, relatively compact structure which can be carried by the user and thereafter deployed in the field. The present invention thus provides a camouflaged game blind which is equipped with a shooting portal and is also equipped with internal, air-inflatable seat cushions. The advantages of this will be better understood on a description of the present invention as will follow below.

BRIEF SUMMARY OF THE DISCLOSED EMBODIMENT

The present invention is summarized as incorporating a hollow canvas tube arranged around a large diameter spring. The spring extends between two end-located metal rings which are sewed in end-located grommets or eyelets of the canvas tubing. The canvas tubing is preferably made of a waterproof material and also includes a top or flap to exclude weather. A shooter's portal is formed in one side of the tubular canvas, and it has a closable flap which can be internally opened and closed by pulling the flap open on the interior. On the opposite side, the apparatus further includes cushions which form a seat or chair. There is a bottom cushion which is air-inflated. Additionally, the apparatus includes a back cushion which is also air-inflated. The two cushions are alternately attached on the interior by snaps, and they provide comfort to the hunter as he sits in the game blind of the present invention.

DETAILED DESCRIPTION OF THE ILLUSTRATED EMBODIMENT

Figure 1:
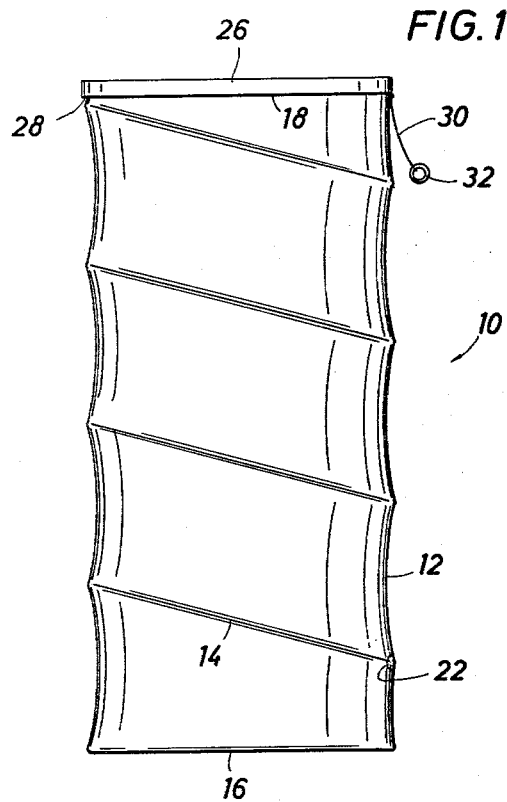
FIG. 1 is an external view of the deployed game blind of the present invention showing an extended, elongate coil spring which is surrounded by a canvas cover and which is closed at the top end by a flap to exclude inclement weather.

Attention is first directed to FIG. 1 of the drawings where the present invention is identified by the numeral 10. The apparatus 10 incorporates a canvas tube 12 which is deployed around a spring 14. The spring 14 has several turns. It can be collapsed quite easily on the application of axial force. The spring extends from a bottom ring 16 to a top ring 18. The rings 16 and 18 have equal diameters to the coil spring 14. Thus, the spring 14 can be collapsed, and the hunter will thereafter have an easily managed, compact structure which includes perhaps six or eight turns of coil spring captured between the end rings 16 and 18. This is a total of about six to twelve rings in the hand of the hunter which can be easily held by hand, or, in the alternative, a simple strap around the apparatus will collapse the coil spring 14 for transportation. The coil spring 14 has sufficient strength to stand upright when deployed. It has sufficient resiliency to be telescoped to a stacked height of perhaps around 10.0 centimeters. When extended, it preferably stands about 200.0 centimeters tall. The interior is about 50–70 centimeters in width, and this is the inside diameter of the preferred embodiment of the spring 14. The spring can be made of relatively thin wire or thin wall tubing. The material used in its construction can be plastic or metal. Preferably, the same material is used to make the end rings 16 and 18. The end rings 16 and 18 attach to the coil spring 14.

The numeral 12 identifies a cloth or canvas tubing. It is preferably made of a waterproof material such as cloth which has been impregnated with a waterproofing agent. In the alternative, manmade waterproof materials can be used. It has a length which is equal to the maximum dimensions named above, and it fits around the coil spring 14. Ideally, the canvas tube is tacked in some form or fashion to the spring 14. One mode of attachment is to attach small straps or to otherwise form eyelets on the interior, and one such eyelet is identified by the numeral 22. The eyelets guide the tube as it is deployed. They are not essential and can be omitted so that the canvas tube fits only around the end rings 16 and 18 with eyelets. The end rings 16 and 18 thus are attached to the canvas tube by forming many eyelets which receive the end rings. Many eyelets function as a cuff able to hold the end ring received in the eyelets. The coil spring 14 pushess against the end rings to elongate the tube 12. The coil 14 is affixed to the end rings by welding or some other suitable means.

As shown in FIG. 1, a generally circular top flap 26 is positioned over the top end to close it against inclement weather. The top flap may be equipped with or without a ring around its periphery. If it has a ring, it functions then substantially as a lid which is simply laid on the top. Ideally, the top is attached at a cloth or canvas tab 28 at one edge and has an elongate canvas strap 30 on the other side. The canvas strap 30 supports a ring 32 which is incorporated so that the hunter, when positioned in the game blind, can reach through the gun portal to be described, grab the ring 32 and pull it downwardly to thereby pull the top 26 to a concentric closing position above the open upper end.

Figure 2:
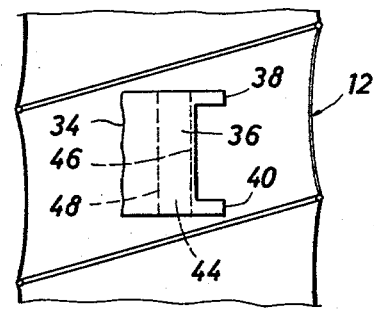
FIG. 2 is an inside view showing one wall of the canvas tube which is constructed and arranged to define a gun positioning portal which can be closed or opened by the hunter.

Attention is next directed to FIG. 2 of the drawings where the interior of the canvas or cloth tube 12 is shown. On the interior, there is a flap which is provided for the benefit of the hunter to serve as a gun portal. The flap includes a reinforced seam 34 at one edge. It has a height which more than covers the maximum size of the portal. The flap 36 extends over an external portion to be described and terminates in a tab 38 at the top and a similar tab 40, the two tabs serving as fasteners. The tabs 38 and 40 are made of Velcro material. This is a kind of adhesive strapping or friction grip material. The flap 36 covers over an opening 44 which is defined by opposing edges 46 and 48. These edges are formed in the outer surface but are covered over by the flap 36 when it is closed. The flap 36 thus covers over the gun portal. The gun portal has a width of a few centimeters, perhaps 10.0 or 15.0 centimeters, and has a height of perhaps 20.0 or 30.0 centimeters. These dimensions are not fixed and can be varied depending on the height of the hunter, the size of the weapon which he uses, whether the game is low on the ground or high in the air, and other factors. Moreover, the location of the gun portal shown in FIG. 2 can also be varied in the canvas tube.

Normally, one gun portal is adequate for the equipment, and a second one is not normally required.

Figure 3:
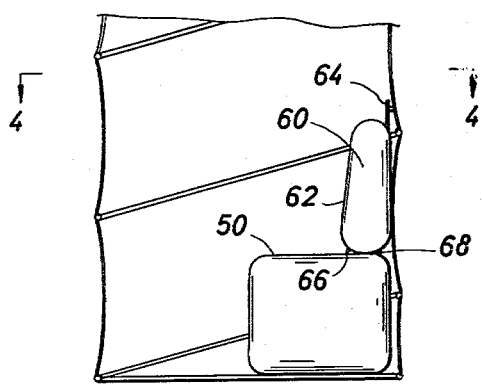
FIG. 3 is a side view of air-inflatable cushions located in the canvas tube to devise a seat for the hunter.
Figure 4:
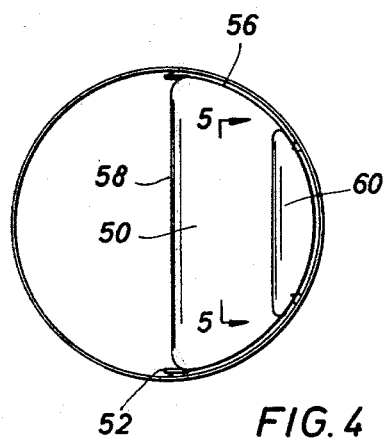
FIG. 4 is a top view along the line 4—4 of FIG. 3 showing additional details of construction of the seat.

In FIG. 3 of the drawings, the numeral 50 identifies an air-inflatable seat cushion. The cushion 50 has a semi-circular external profile, as shown in FIG. 4 of the drawings. It is an air-inflatable, shaped plastic container which can be inflated by the user either with a hand pump or by mouth. To this end, it includes a spigot 52 for ease of inflation. It is shaped by the seams 56 and 58, these seams defining the shape or profile of the cushion. Thus, the top face of it is generally horizontal, and the outer periphery as shown in FIG. 4 is semicircular so that it will fit substantialy concentric within the tube. In addition, a separate cushion 60 is shown in FIG. 3 of the drawings, and it also is an air-inflatable cushion. The cushions 50 and 60 are preferably similar in construction, namely, being made of sheet plastic material with seams formed to yield the desired shape. The shape for the back cushion 60, again, is concentric with the tube in which it fits, and it provides a front face 62 to serve as a back rest. It also includes a spigot 64. The spigots 52 and 64 enable both cushions to be independently inflated. The spigots 52 and 64 are of construction typically found on air mattresses and the like. They include a hose and closure clamp mechanism.

Figure 5:
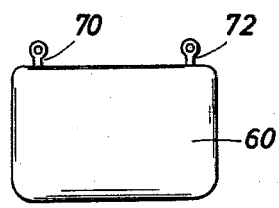
FIG. 5 is a view looking along the line 5—5 of FIG. 4 showing details of attachment of the seat to the canvas tubing which forms the gun blind of the present invention.

The two cushions are preferably joined to one another at a common set of seams at 66 and 68. Through the use of ultrasonic welding techniques, the two can be joined together. The two cushions thus form an assembly which is a chair or seat for the hunter. Ideally, the seat can be removed from the preferred embodiment so that the hunter may stand erect in the game blind if he desires. A suitable means of attachment for affixing the cushion is incorporated. FIG. 5 is a view of the top portion of the seat back 60 which includes a first strap 70 and a second strap 72. The straps 70 and 72 are symmetrically deployed and terminate in eyelets. These eyelets affix to mating connectors attached to the inside of the canvas tube. They connect the canvas tube to the seat or cushion. It is not mandatory that they remain connected. As an example, it may be easier to carry the inflatable seats in a separate container, while the rings which form the tube define a simple stacked set of rings (with loose canvas more or less folded thereabout so that it can be carried under the arm or perhaps with the hunter's arm looped through the rings). This provides a more readily portable structure.

While the foregoing is directed to the preferred embodiment of the present invention, the scope of the present invention is determined by the claims which follow.

I claim:
1. A portable hunting blind comprising:
(a) an elongate coil spring of internal diameter sufficient to encircle a hunter and having an extended height to enclose the hunter;
(b) a flexible cloth cover having an elongate tubular shape with an open upper end fastened around said spring, said cloth cover elongating with said spring to enclose the hunter therein and including a separately movable, circular, top flap at one end thereof to cover said open upper end to protect the hunter against inclement weather;
(c) inflatable seat means fitting within said elongate spring and said flexible cloth cover for supporting a hunter seated thereon, said inflatable seat means comprising a bottom cushion which is inflated to form and define a generally horizontal surface enabling the hunter to sit thereon and which further includes an inflated back cushion positioned relative to the bottom cushion to serve as a back rest, said back cushion and said bottom cushion being two separately inflatable cushions, each having valve means for inflation and each of said valve means being separately closable;
(d) said back cushion being affixed to said bottom cushion at a location to define an upstanding back support adjacent to a horizontal surface, said seat means having a semicircular external profile to concentrically fit within said tubular shaped cloth cover;
(e) releasable connective means provided on said back cushion for attaching said seat means to said flexible cloth cover; and
(f) portal means in said cloth cover closable by a selectively movable portion of said cloth cover which is arranged adjacent to said portal means for closing said portal means and which alternately opens said portal means to enable the hunter to position a weapon for discharge through said portal means.

* * * * *